United States Patent [19]
Du Bois et al.

[11] 3,746,036
[45] July 17, 1973

[54] DIAPHRAGM VALVE

[75] Inventors: Chester G. Du Bois, Zion; Paul R. Hunt, Lindenhurst, both of Ill.

[73] Assignee: Outboard Marine Corporation, Waukegan, Ill.

[22] Filed: Nov. 2, 1970

[21] Appl. No.: 85,954

[52] U.S. Cl............... 137/496, 137/510, 251/61.3
[51] Int. Cl............................................. F16k 15/14
[58] Field of Search................... 137/496, 482, 500, 137/503, 505.37, 505.43, 510; 251/61.3

[56] References Cited
UNITED STATES PATENTS

| | | | |
|---|---|---|---|
| 1,022,407 | 4/1912 | Cramer | 137/510 |
| 1,507,073 | 9/1924 | Lewis | 137/510 X |
| 2,599,872 | 6/1952 | Slonneger | 251/61.3 |
| 3,140,726 | 7/1964 | Arenhold | 137/510 X |
| 3,433,255 | 3/1969 | Cubberley et al. | 137/510 |
| 3,534,768 | 10/1970 | Powell | 137/496 |

FOREIGN PATENTS OR APPLICATIONS

| | | | |
|---|---|---|---|
| 329,142 | 5/1958 | Switzerland | 137/510 |

*Primary Examiner*—Henry T. Klinksiek
*Assistant Examiner*—Robert J. Miller
*Attorney*—Robert K. Gerling, John W. Michael, Robert E. Clemency, Gerrit D. Foster, Bayard H. Michael, Paul R. Puerner, Joseph A. Gemignani, Andrew O. Niteris and Spencer B. Michael

[57] ABSTRACT

The invention provides an improved valve for regulating the flow of fluids. The valve includes a housing defining in part a flow passageway. The flow passageway has a port surrounded by a valve seat. A diaphragm is mounted within the housing and assists in completing the flow passageway. The diaphragm is moveable between a first position to cause closing of the port and a second position to cause opening of the port. A spring operates on the diaphragm urging it to close the port. A suction force operates on the same side of the diaphragm as the spring creating a pressure differential on opposite sides of the diaphragm. The pressure differential is effective to overcome the action of the spring thereby displacing the diaphragm to an open position and allowing flow of fluid through the port.

1 Claim, 4 Drawing Figures

PATENTED JUL 17 1973
3,746,036
SHEET 1 OF 2
FIG. 1
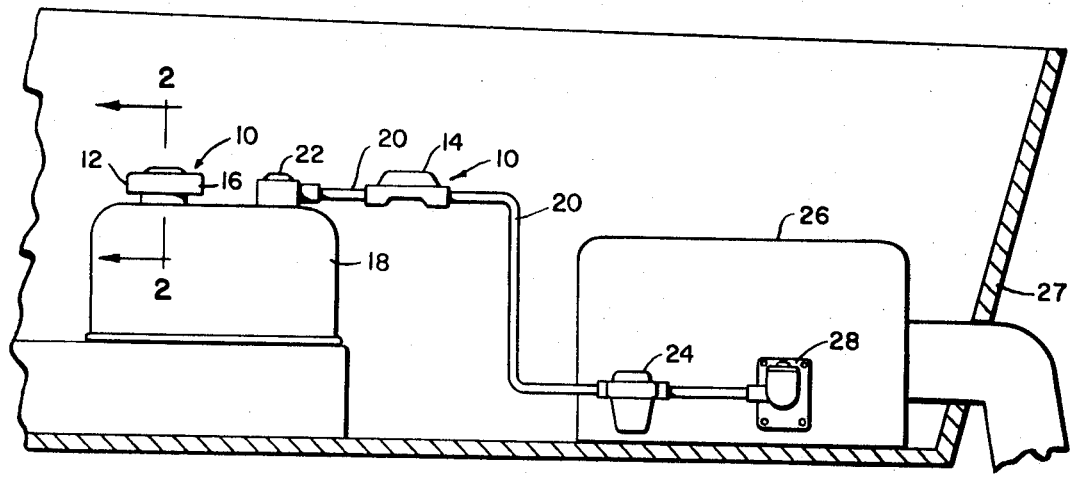
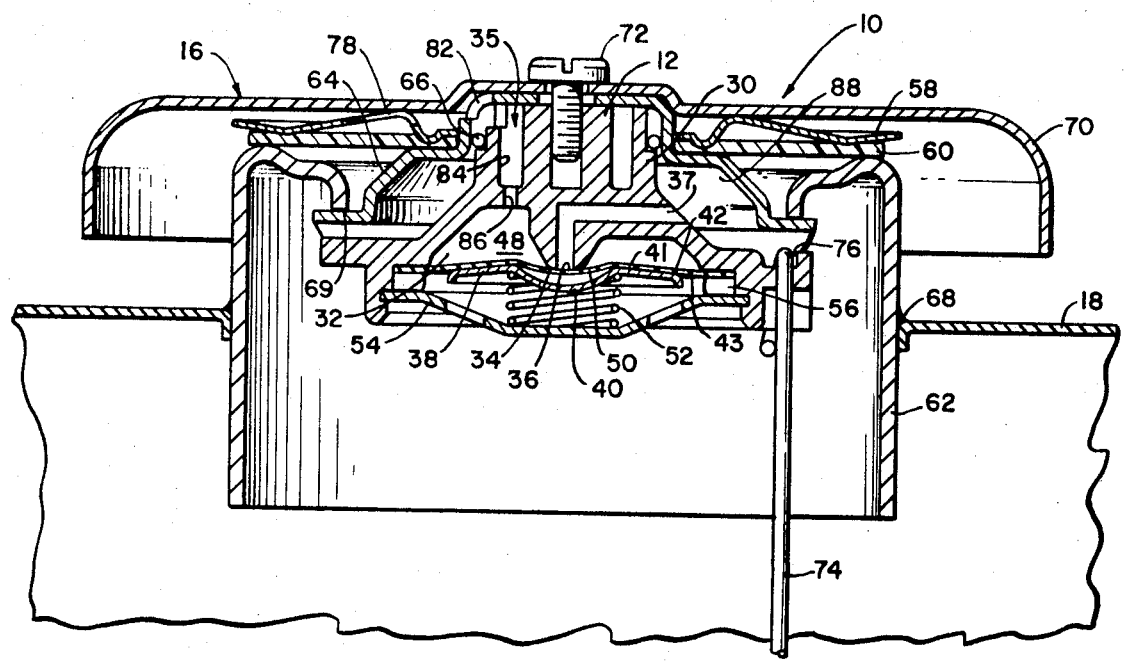
FIG. 2
INVENTORS
CHESTER G. DuBOIS
PAUL R. HUNT
BY R.K.Gerling
ATTORNEY

PATENTED JUL 17 1973

INVENTORS
CHESTER G. DuBOIS
PAUL R. HUNT

BY *R. K. Gerling*

ATTORNEY

DIAPHRAGM VALVE

BACKGROUND OF INVENTION

The diaphragm valve is adapted for a number of different uses such as a vent valve in the cap of a portable fuel tank or an an anti-siphon valve in a fuel system. The application of the diaphragm valve as a vent valve for a portable fuel tank allows the entry of air into the tank as fuel is withdrawn, as well as preventing the escape of dangerous fuel vapors from the tank. The application of the diaphragm valve as an anti-siphon valve minimizes the possibility of spillage of liquid fuel under all normal operational or comtemplated failure conditions. In both of these uses the invention diminishes the effects of pollution and substantially reduces the changes of fire or explosion. In addition, anti-siphon protection is now required by the Boating Industry Association for boat certification.

SUMMARY OF THE INVENTION

This invention relates to a valving means and more particularly to an improved diaphragm valve for regulating the flow of fluids.

A primary object of this invention is a valving means for effectively sealing and readily opening a port in a flow passageway.

A further object is an improved diaphragm valve which permits the use of high unit pressure to seat the valve yet allows a small pressure differential to open the valve.

Another object is a novel valve which readily permits a diaphragm to engage a port with a uniform force all around the seating area.

Another object is a valve which prevents the escape of harmful fuel vapors from a fuel tank and is adapted to permit air to enter the tank as fuel is withdrawn.

Another object is a valve which is adapted to provide anti-siphon protection for a fuel system wherein at least one portion of the system is below the fuel level in the tank.

Another object is a reliable valve which may be economically manufactured and is generally insensitive to foreign particles.

Other objects and advantages will be apparent from the following description and accompanying drawings for the invention.

THE DRAWINGS

The invention is illustrated by the accompaning drawings wherein:

FIG. 1 is a side view of a fuel system for a marine propulsion unit;

FIG. 2 is an enlarged section view of a diaphragm valve taken along line 2—2 in FIG. 1;

DETAILED DESCRIPTION

Figure 3:
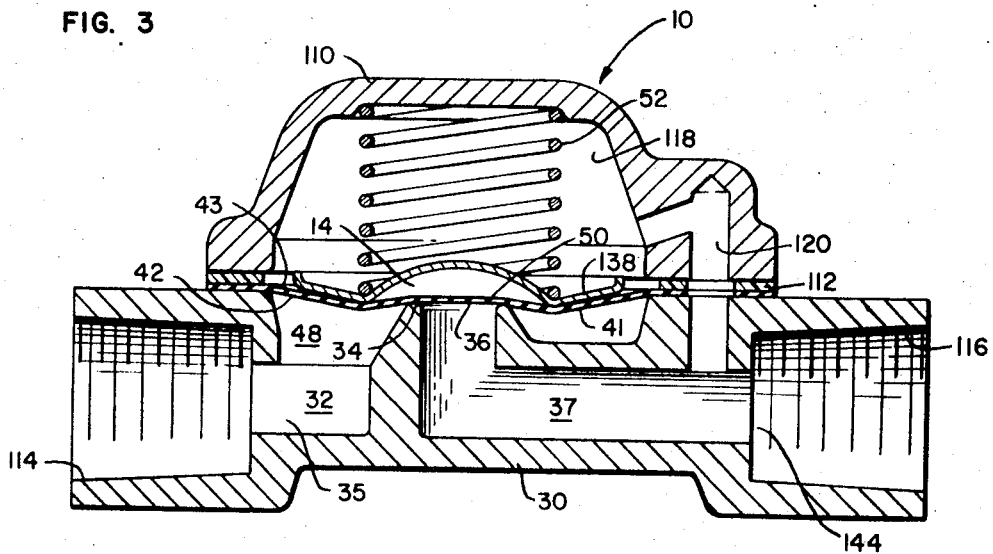
FIG. 3 is an enlarged section view of the invention in use as an anti-siphon valve.

Referring to the drawings in more detail, it will be seen that the diaphragm valve 10 includes a housing 30 partially defining a flow passageway 32 therein. The flow passageway 32 includes a port 36 surrounded by a valve seat 34. The port 36 separates the flow passageway into an upstream portion 35 and a downstream or outlet portion 37.

A diaphragm 42 mounted within the housing 30 cooperates with the housing to assist in completing the flow passageway 32. THe diaphragm 42 is movable between a first position to close the port 36 and a second position to open the port. A spring 52 operates on the diaphragm 42 to move it to the first position thereby closing the port 36. A means for subjecting the diaphragm 42 to a pressure differential in response to a reduction in pressure in the downstream portion 37 is effective to overcome the spring 52 and displace the diaphragm to an open position allowing flow of fluid through the port 36.

The invention is adapted for use wherever it is necessary to regulate the flow of fluids. This encompasses a variety of uses in various environments and situations. Two examples of the many uses for the diaphragm valve are shown and described in this application. FIG. 1 shows both of these uses wherein the diaphragm valve 10 is used as a vent valve 12 in a portable fuel tank and as an anti-siphon valve 14 in a fuel system.

As shown in FIG. 1, the vent valve 12 is placed in a cap 16 for a fuel tank 18 of the three or six gallon type adapted for marine use. The cap 16 may be secured to the tank 18 in any conventional manner such as a screw fit, an interference fit or a bayonet type fitting shown in FIG. 2. The vent valve 12 permits air to enter the tank 18 as fuel is withdrawn, in addition to preventing the escape of fuel vapors from the tank at all times. This provides an important safety improvement substantially eliminating the chances of explosion due to escaping vapors.

The anti-siphon valve 14 is shown in a fuel line such as a flexible hose 20 wherein at least one portion of the fuel system is below the fuel level in the tank 18. The anti-siphon valve 14 may be placed in the fuel line between a fuel tank withdrawal assembly 22 and a fuel pump 24 mounted on a marine propulsion unit 26. The marine propulsion unit 26 is shown in FIG. 1 as mounted in the transom portion of a boat 27.

The fuel pump 24 delivers fuel from the tank 18 through the flexible hose 20 to a carburetor 28 on the marine propulsion unit. Any break in the fuel system below the tank fuel level such as a ruptured pump diaphragm, a carburetor float valve leak, or a broken hose would permit fuel to siphon from the tank 18 when the marine propulsion unit 26 is shut down. The anti-siphon valve 14 permits this from occurring in the fuel system substantially reducing the chances of fire.

FIG. 2 is a detailed section view of the diaphragm valve 10 in use as a vent valve. The vent valve 12 may be mounted in the cap 16 as shown or in a separate housing in a fuel tank 18. The vent valve 12 includes a valve housing 30 which together with a diapgragm 42 defines a flow passageway 32. A valve seat 34 within the valve housing surrounds a port 36 for the flow passageway. The port 36 separates an upstream portion 35 of the flow passageway from a downstream portion 37.

The diaphragm 42 has a first side 41 and a second side 43 and is preferably a thin flexible membrane. THe diaphram 42 includes a valve part 50 and may be made from any number of materials impervious to fluids such as fabric material, plastic, rubber or elastic synthetic materials having similar properties.

A moveable support 38 engages the second side of the diaphragm 42. The support 38 preferably includes a cupped or depressed middle portion 40 which is aligned with the port 36. As shown in this embodiment the support 38 is moveable in response to movement of the diaphragm 42 to thereby open and close the port of the flow passageway.

A spring such as the spiral spring shown at 52 is supported by a retainer 54 and engages the movable support 38. In this manner the spring 52 forces the diaphragm 42 against the valve seat 34 to seal off the port 36. The port 36 is therefore sealed by a high unit pressure preventing the escape of harmful fuel vapors from within the tank 18, as well as halting the flow of air into the tank when desired.

In accordance with the invention, the interior of the fuel tank 18 is completely sealed from the atmosphere. Along with the impervious barrier of the diaphragm 42, the retainer 54 supports a first gasket 56 and the diaphgram in sealing contact with the housing 30. An O-ring 66 or similar sealing member provides a tight closure between the valve housing 30 and a cup member 64. An annular diaphgram 58 perferably made from brass, provides a spring force on a second gasket 60 holding it in sealing contact with the cup member 64 and a filler neck portion 62. To help complete the seal for the interior of the tank 18 the filler neck portion 62 may be secured to the tank by any suitable means such as the spot weld shown at 68.

As previously mentioned the cap 16 may be secured to the tank 18 by a bayonet type fitting provided between the filler neck portion 62 and the cup member 64. Cup member 64 fits through a slot (not shown) in the filler neck portion 62. When the cup member 64 is rotated by turning a cover or lid 70 it will seal securely over a cam surface 69 provided by the filler neck portion.

The cover 70 may be held against the cup member 64 by any suitable means such as spot welding the two members together at any point where their respective surfaces are adjacent each other. A screw 72 or similar fastening means secures the valve housing 30 to the cup member 64. An anchor link 74 fits over a flange 76 on the valve housing and may be used to anchor the valve housing to the bottom of the tank.

The upstream portion 35 of the flow passageway is maintained at atmopsheric pressure. This is accomplished by means of a series of openings through various members in the cap 16. An apperture 78 in the annular diaphragm 58 leading to the surrounding atmosphere lets air into a caviity 80. The air then passes through an opening 82 in the cup member 64 and into an annular groove 84 in the valve housing 30. From the annular groove the air passes through an internal opening 86 in the housing 30 and into a chamber 48. The chamber is defined by the housing 30 and the first side 41 of the diaphgram and is thus continually maintained at atmospheric pressure.

As fuel is withdrawn from the tank 18, the internal pressure within the tank will decrease to below atmospheric pressure. This will cause a reduction in pressure operating over the entire surface area of the second side 43 of the diaphgram. In addition there will be a decrease in pressure operating over a relatively small area of the first side 41 of the diaphragm defined by the valve seat 34.

The spring 52 is designed so that when the internal pressure in the tank 18 reaches 6 to 8 inches of water below atmospheric pressure it will cause the diaphragm 42 to move away from the valve seat 34. This permits air to pass through the port 36 into the outlet portion 37 and continue into the tank 18 through an annular chamber 88 between the valve housing 30 and the cup member 64. Thus, the invention permits air to enter the tank 18 as fuel is withdrawn.

FIG. 3 is a section view of the diaphragm valve 10 in use as an anti-siphon valve for a fuel system. As shown in this figure, the design of the anti-siphon valve 14 is substantially similar to the vent valve 12 shown in FIGS. 1 and 2.

The anti-siphon valve 14 has a valve housing 30 which includes a cover 110. A flexible diaphragm 42 engages a support 38 and defines with the housing 30 a flow passageway 32. A port 36 separates the flow passageway into an upstream portion 35 and a downstream portion 37. A gasket 112 resting against the cover holds the diaphragm 42 in sealing contact with the housing 30. A spring 52 engages the movable support 38 and forces a valve part 50 of the diaghragm against a valve seat 34 to seal off the port 36.

The upstream portion 35 of the flow passageway has an opening 114 for connecting to the flexible hose 20 as shown in FIG. 1. This portion of the hose leads to the fuel tank withdrawal assembly 22. An outlet 144 in the downstream portion 37 of the flow passageway includes an opening 116 for connecting to the downstream side of the flexible hose 20. This portion of the hose leads to the fuel pump 24 on the marine propulsion unit 26 also shown in FIG. 1.

A first chamber 48 defined by the valve housing 30 and the first side 41 of the diaphgram is maintained at a relatively constant pressure. A second chamber 118 is defined by the cover 110 and the second side 43 of the diaphgram. The action of the fuel pump 24 creates a vacuum and reduces the pressure in the second chamber 118 through an auxiliary passageway 120 in the outlet portion 144. This causes a reduction in pressure to operate over the entire surface area of the second side 43 of the diaphragm.

The spring 52 is designed so that at a predetermined pressure differential between the first side 41 and the second side 43, the closing action of the spring will be overcome and the diaphragm 42 with the support 38 will move away from the valve seat 34. This opens the port 36 to permit flow of fuel into the outlet portion 144 where it is free to flow through the flexible hose 20 to the fuel pump 24.

When there is a break in the fuel system, the pressure in the second chamber 118 will immediately increase as the fuel pump 24 will no longer create a vacuum and reduce the pressure in the second chamber. This causes the pressure differential working on opposite sides of the diaphragm 42 to diminish and the spring 52 will again take over to move the diaphragm back into contact with the valve seat 34. In this manner the port 36 will be closed preventing the siphoning of fuel from the tank 18.

In the embodiments shown in FIGS. 2 and 3 at least a portion of the valve part 50 of the diaphragm is unsupported. The unsupported portion of the diaphragm 42 is created by the cupped middle portion of the support 38. This permits the flexible diaphragm to conform to the valve seat 34 with a uniform force all around the seating area with minimum regard to the squareness of the spring 52 with the valve seat. In other words, the spring 52 need not be at exact right angles to the valve seat 34 to accomplish a uniform sealing force at the port 36.

Figure 4:
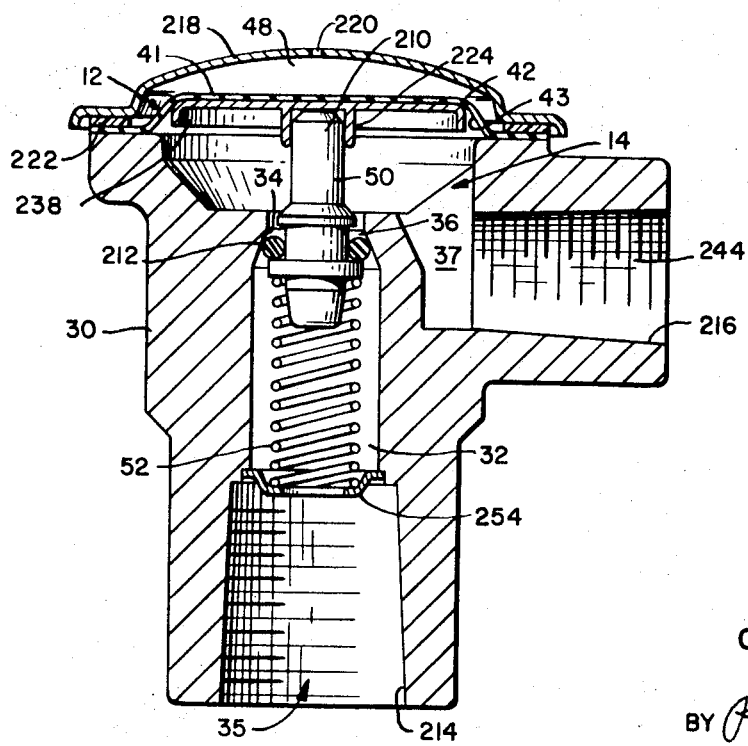
FIG. 4 is an enlarged section view of another embodiment of the invention.

Another embodiment of the anti-siphon valve 14 is shown in FIG. 4. A valve housing 30 defines in part a flow passageway 32. A valve seat 34 surrounds a port 36 for the flow passageway. The port 36 separates an upstream portion 35 of the flow passageway from a downstream portion 37. A flexible diaphragm 42 has a first side 41 and a second side 43. The second side of the diaphgram engages a moveable support 238 and together with the housing completes the flow passageway 32.

In this embodiment a valve part 50 is in the form of a valve body 210. The valve body abuts the moveable support 238 and is held in position by a downwardly extending flange 224. The valve body 210 rides in the valve seat 34 and is adapted to move up and down. A spring 52 mounted on a retainer 254 urges the valve body toward a closed position with the valve seat 34. An O-ring 212 or similar sealing member fits snugly around the valve body 210 and is adapted to engage the valve seat 34 in sealing contact with upward movement of the valve body 210.

The housing 30 includes a cover 218. A gasket 222 provides a seal between the cover 218 and the periphery of the diaphragm 42. A first chamber 48 is defined by the cover 218 and the first side 41 of the diaphragm. A vent 220 in the cover leads to the atmosphere and maintains the first chamber 48 at a substantially constant uniform pressure.

The upstream portion 35 of the flow passageway has an opening 214 for connecting to the felxible hose 20. That portion of the flexiblehose leads to the fuel tank withdrawal assembly 22 shown in FIG. 1. An outlet 244 in the downstream portion 37 of the passageway has an opening 216 for connecting to that portion of the flexible hose 20 leading to the fuel pump 24. When the fuel pump is in operation, this maintains the outlet 244 at a pressure below atmospheric pressure. This pressure differential operating on opposite sides of the diaphragm overcomes the action of the spring 52 and moves the diaphragm 42, support 238, and valve body 210 down to open the port 36.

In case of failure within the fuel system the outlet portion 244 will quickly reach atmospheric pressure eliminating the pressure differential working on opposite sides of the diaphragm 42. This will move the diaphragm 42, support 238 and valve body 210 up to close the port 36. In this manner flow of fluid through the anti-siphon valve 14 is controlled.

It should be noted that for all the embodiments of this invention a relatively constant uniform force operates on the majority of the surface area of the first side 41 of the diaphragm. A suction means which causes a reduction in the pressure in the downstream portion 37 of the flow passageway operates on the majority of the surface area of the second side 43 of the diaphragm. This causes a pressure differential on opposite sides of the diaphragm 42 which is effective to overcome the action of the spring 52 and thereby opens the port 36 to allow flow in the passageway 32.

Various features of the invention are set forth in the following claims.

We claim:

1. A valve for controlling flow in response to downstream pressure variation, said valve including a housing having means at least partially defining a flow passageway having a port surrounded by a valve seal, said port separating an upstream portion of said flow passageway from a downstream portion, a diaphragm mounted on said housing and being movable relative to said port between a port closing position and a port opening position, said diaphragm including a first side subject to atmospheric pressure producing a first force urging said diaphragm toward said port opening position, and a second side cooperating with said housing to assist in completing said flow passageway and subject, in part, to the pressure condition in said downstream portion of said flow passageway, a diaphragm support engaging at least a portion of said diaphragm and having a cupped middle portion and movable in common with said diaphragm, and a spring engaged with said support and urging said diaphragm toward said port closing position, whereby, when said downstream passageway portion is subject to a pressure condition below atmospheric pressure, such subatmospheric pressure produces a second force which acts in common with said first force and in opposition to said spring so as to displace said diaphragm toward said port opening position, and whereby, when said downstream flow passageway portion is subject to a pressure higher than sub-atmospheric pressure, such higher pressure produces a second force acting counter to said first force and said spring displaces said diaphragm toward said port closing position.

* * * * *